3,467,618
HALLOYSITE-FILLED PHENOLIC MOLDED COMPOSITION
William P. Bramlett, Jr., Lancaster, Pa., assignor to Armstrong Cork Company, Lancaster, Pa., a corporation of Pennsylvania
No Drawing. Filed Dec. 21, 1966, Ser. No. 603,420
Int. Cl. C08g 51/06, 37/16
U.S. Cl. 260—38                                5 Claims

ABSTRACT OF THE DISCLOSURE

A molded article such as a cap for jars and containers having a phenol-formaldehyde resin in cured form as the binder and containing halloysite clay as a filler. Conventional lubricants, colorants, and additional filler may also be present in the composition.

BACKGROUND OF THE INVENTION

Field of the invention

The invention relates to molded articles such as caps for closing containers, particularly under conditions where the caps are exposed to water or moisture.

Description of the prior art

Patents such as U.S. 1,845,811, 3,080,256, and 3,243,397 describe compositions comprising phenolic resins and clay fillers. Yet these clay fillers are primarily of the kaolin type and yield phenolic molded cured compositions which possess certain deficiencies, particularly in the jar and container closing art. Although halloysite clay is a known thickener for increasing the viscosity of liquids as shown in U.S. 2,885,360 and 2,489,521, apparently no one has hinted at using the halloysite clay as a filler in phenol-formaldehyde resinous molding compositions to impart unusually desirable properties thereto.

Summary of the invention

The invention contemplates a cured molded composition having a phenol-formaldehyde resin binder and a filler comprising halloysite clay. The halloysite clay imparts improved properties to the cured molded composition. The cured composition containing the halloysite has a superior strength or better resistance to dimensional change or both when exposed to moist conditions as compared with conventional fillers such as kaolins, asbestos fibers, glass fibers, wood flour, and mixtures thereof. Conventional compounding ingredients may also be present in the composition.

Description of the preferred embodiments

A typical composition of the present invention will fall within the following amounts of the stated ingredients:

| Ingredients: | Percentage range |
|---|---|
| Phenol-formaldehyde resin, curable | 10–100 |
| Halloysite clay | 10–75 |
| Cure accelerated (e.g. lime) | 0–10 |
| Lubricant (e.g. calcium stearate) | 0–10 |
| Colorant or pigment (e.g. carbon black) | 0–5 |

The phenol-formaldehyde resin to be used will be any of the typical molding resins. Such resins are normally spoken of as being Novolak and B-stage resins which are cured to the thermosetting form by the addition of formaldehyde and an alkaline catalyst or by the addition of hexamethylenetetramine. These molding phenol-formaldehyde resins are common items of commerce and may readily be purchased on the open market. The resins in the form of their powders are normally mixed with such fillers as asbestos, clays, wood flour, mineral wool, glass fibers, and the like. Lubricants for greater molding efficiency may be used as will dyes or pigments to impart the desired color to the cured object. Many of the molding powders are blended with alkaline materials such as lime in order to increase the rate of cure when the blended molding powder is finally placed in the mold and subjected to elevated heat and pressure to cure the powder and form the final article. The halloysite clay which forms the basis of the present invention is said to have the formula $Al_2O_3 \cdot 3SiO_2 \cdot 2H_2O$. Halloysite clay is normally used as a thickener, in refractories, and as a petroleum cracking catalyst.

It is the surprising discovery herein that an improved molded article will be produced by incorporating in the molding powder from which the molded article is made an amount of halloysite clay in the range of about 10–75% by weight of the total molding composition. The phenol-formaldehyde resin itself will normally be present in the range of 10–90% by weight of the total molding powder composition. A preferred composition will run about 60–70% phenol-formaldehyde resin, 25–35% by weight halloysite clay, and about 2–10% by weight of pigments, lubricants, and curing accelerator.

The presence of the halloysite clay calls for no changes in conventional molding procedures, and conventional equipment may be used to form the desired articles. Caps for jars and containers are readily made on conventional equipment by molding at a temperature in the range of about 360°–380° F. for a period of time of 15–40 seconds, longer times within these ranges being required at lower temperatures.

The following example illustrates the composition of the present invention as well as the improvements obtained by its use as contrasted with prior and known compositions.

EXAMPLE

A series of six compositions was made, each having the following formula:

| Ingredients: | Parts by weight |
|---|---|
| Phenol-formaldehyde curable resin | 65.0 |
| Filler | 28.0 |
| Calcium stearate | 1.5 |
| Lime | 3.0 |
| Carbon black | 2.5 |

The filler in each case differed. Following is a list of the fillers used:

| Filler designation: | Filler |
|---|---|
| A | 100% wood flour. |
| B | 100% asbestos. |
| C | 100% glass fibers. |
| D | 100% kaolin clay. |
| E | 100% halloysite clay. |
| F | 75% halloysite clay–25% wood flour. |

Each composition was milled and then ground on an Alpine grinder to form a molding powder. The powder in each case was molded at 375° F. for 25–30 seconds into a jar cap. Caps from each composition were screwed on glass jars at a torque of 18 inch-pounds. The capped assemblies were then all stored for two weeks at 100° F. in 95% relative humidity.

At the end of the two-week period in high humidity, the torque necessary to start removal of each cap was measured. This parameter is known as removal torque. Following are the results:

| Filler: | Removal torque in pounds |
|---|---|
| A | 0–2 |
| B | 3–4 |
| C | 5–6 |
| D | 5–6 |
| E | 6–8 |
| F | 6–8 |

These data show that the caps containing the halloysite clay did not swell as much in the moist atmosphere as did the other caps having conventional fillers, and thus maintained better seals.

I claim:

1. A molded article comprised of a cured phenol-formaldehyde resin and about 10–75 percent by weight halloysite clay.

2. A molded article according to claim 1 containing a filler in addition to halloysite clay.

3. A molded article according to claim 1 containing a lubricant and a colorant.

4. A molded article according to claim 1 wherein said molded article is comprised of 10–90 percent by weight of said phenol-formaldehyde resin.

5. A molded article according to claim 1 comprised of about 60–70 percent by weight phenol-formaldehyde resin, about 25–35 percent by weight halloysite clay, and about 2–10 percent by weight of a member selected from the group consisting of pigments, lubricants, curing accelerators, and mixtures thereof.

References Cited

UNITED STATES PATENTS

| 3,218,182 | 11/1965 | Hemstock et al. | 106—288 |
| 3,224,892 | 12/1965 | Hemstock et al. | 106—288 |
| 3,243,397 | 3/1966 | Herkheimer et al. | 260—38 |

OTHER REFERENCES

62CA, 5445g (1965); 48CA, 11987f (1954); 63CA, 18453b (1965).

MORRIS LIEBMAN, Primary Examiner

U.S. Cl. X.R.

106—288